United States Patent [19]
Fujisaki

[11] Patent Number: 5,809,346
[45] Date of Patent: Sep. 15, 1998

[54] IMAGE STABILIZING DEVICE

[75] Inventor: Tatsuo Fujisaki, Yokohama, Japan

[73] Assignee: Canon Kabushiki Kaisha, Tokyo, Japan

[21] Appl. No.: 400,668

[22] Filed: Mar. 8, 1995

Related U.S. Application Data

[63] Continuation of Ser. No. 953,184, Sep. 29, 1992, abandoned, which is a continuation of Ser. No. 661,404, Feb. 26, 1991, abandoned.

[30] Foreign Application Priority Data

Feb. 27, 1990 [JP] Japan ................................. 2-046043

[51] Int. Cl.⁶ ............................ G03B 17/00; G02B 27/64
[52] U.S. Cl. ............................................................. 396/55
[58] Field of Search ........................... 354/430, 70, 202; 359/554–557; 348/208; 396/52–55

[56] References Cited

U.S. PATENT DOCUMENTS

| | | | |
|---|---|---|---|
| 4,623,930 | 11/1986 | Oshima et al. | 354/430 |
| 4,970,540 | 11/1990 | Vasey et al. | 354/70 |
| 5,084,724 | 1/1992 | Maeno | 354/430 |
| 5,107,293 | 4/1992 | Sekine et al. | 354/430 |
| 5,170,255 | 12/1992 | Yamada et al. | 358/222 |
| 5,198,896 | 3/1993 | Kondo et al. | 358/222 |
| 5,210,563 | 5/1993 | Hamada et al. | 354/400 |

Primary Examiner—W. B. Perkey
Attorney, Agent, or Firm—Robin, Blecker & Daley

[57] ABSTRACT

An image stabilizing device includes vibration detection means for detecting a vibrated state, vibration preventing means responsive to the output of the vibration detection means to prevent the vibration of an image, and regulating means for regulating the action of the vibration detection means when the output of the vibration detection means is not appropriate.

11 Claims, 7 Drawing Sheets

IMAGE STABILIZING DEVICE

This is a continuation application under 37 CFR 1.62 of prior application Ser. No. 07/953,184, filed Sep. 29, 1992, abandoned, which is a continuation of Ser. No. 07/661,404, filed Feb. 29, 1991, abandoned.

BACKGROUND OF THE INVENTION

1. Field of the Invention

This invention relates to an image stabilizing device for detecting the vibrated state of an optical instrument caused by hand trembling or the like and stabilizing an image by the detection information.

2. Related Background Art

Recently, for example, still cameras, video cameras, etc., (hereinafter referred to as the cameras for the convenience of description) endowed with the automatic exposure function, the automatic focus adjusting function, etc., have been increasing and failures resulting from unskilled photographing technique have been decreasing.

Therefore, recently, the development of cameras endowed with the function of automatically suppressing a failure in photographing caused by factors other than the cameras, for example, a failure in photographing caused by a photographed image being vibrated by a vibration such as hand trembling, has been put forward.

This hand trembling is a vibration of a relatively low frequency usually occurring as during the release of the camera shutter, and as shown in FIG. 2 of the accompanying drawings, has six degrees of freedom, i.e., translations in a direction Z perpendicular to the optic axis, a vertical direction Y and a direction X perpendicular to the directions Z and Y, and rotational motions $X_r$, $Y_r$ and $Z_r$ about coordinates axes X, Y and Z.

Those of these degrees of freedom which pose the problem of the deterioration of a photographed image are $X_r$ and $Y_r$ (these will hereinafter be generically referred to as the "rotational vibration"), and the bad influence of this rotational vibration becomes greater particularly in proportion to the focal length.

To suppress such rotational vibration, there is generally adopted optic axis changing means for changing the optic axis in conformity with the output of vibration detecting means for detecting the angle of rotation, and correcting the vibration of the camera to thereby making the image on the imaging plane apparently stationary.

As the vibration detecting means of the camera, use is made, for example, of an angular acceleration meter, an angular velocity meter or an angular displacement meter, and the angular displacement meter as an example will hereinafter be described with reference to FIG. 4 of the accompanying drawings.

In FIG. 4, an outer cylinder 211 is filled with high specific gravity liquid 212 and a sensing vane 213 is enclosed therein. The sensing vane 213 is made of a magnetic material or a material having a magnetic material mixed therewith, and has a shape like a cruciform pinwheel, and is supported for rotation about a rotary shaft 214 at the tip end of a holding arm 215 fixed to the outer cylinder 211. The specific gravity of the sensing vane 213 is made equal to the specific gravity of the liquid 212, and the sensing vane is in a substantially floating state so that the influence of frictional force may be extremely small.

Further, a yoke 216 and a yoke 217, both made of a magnetic material, are disposed so as to surround the outer cylinder 211, one end of each of them is fixed to the outer cylinder 211 and the other ends of the yokes support therebetween an iron core 218 around which a coil 219 is wound.

The iron core 218, the yokes 216, 217 and the sensing vane 213 together form a closed magnetic circuit with respect to a magnetic flux provided by the coil 219, and the sensing vane 213 receives a restitutive torque toward a position at which the distance thereof to the yokes is smallest, i.e., a line linking the ends of the yokes 216 and 217.

Outside the outer cylinder 211, there are provided a light emitting element 220 and a light receiving element 221 such as PSD whose output varies in conformity with the light receiving position so that light from the light emitting element 220 may be reflected by a thin piece-like reflecting surface 213a provided near the center of the sensing vane 213 and enter the light receiving element 221.

The coil 219 and the light receiving element 220 are connected to a driving circuit such as a constant current circuit, not shown.

When the rotational motion about the rotary shaft 214 is imparted to the angular displacement meter of such structure, the liquid 212, with the sensing vane 213, tries to become stationary by its own inertia against said rotational motion and therefore, the reflecting surface 213a causes its angular displacement relative to the camera and the phototaking optical path after refection changes. Accordingly, the light receiving position on the light receiving element 221 changes and the output of the light receiving element 221 varies and thus, the angular displacement of the camera is detected. This detected value is set so that it is 0 at the center of the energization of the coil 219 and positive at one side thereof and negative at the other side thereof.

Here, the energization of the coil 219 determines the initial position of the sensing vane 213 and slowly effects centering, thereby preventing the sensing vane 213 from deviating greatly and preventing the light from the light emitting element 220 from deviating from the light receiving range of the light receiving element 221.

Also, as the optic axis changing means, use is made of means utilizing the movement of a correction lens, or a variable vertical angle prism whose vertical angle is variable, and image vibration suppressing means using the variable vertical angle prism will now be described with reference to FIG. 3 of the accompanying drawings. In FIG. 3, for the convenience of description, showing is made with the rotation of the camera replaced by the relative rotation of an object to be photographed.

FIG. 3A shows a state in which image vibration caused is not being suppressed.

In the figure, a photo-taking lens L is fixedly held in a camera body 5 to form the image of an object O on the surface of film or the surface of a photo-taking element (hereinafter generically referred to as the film surface).

In front of the photo-taking lens L, there is disposed an accordion-shaped variable vertical angle prism comprising transparent liquid 1 having high refractive index and interposed between two transparent plates 2a and 2b and having the outer periphery thereof enveloped by resin film 3, the prism being sandwiched between frame members 4a and 4b. The transparent plate 2a is rotatable about a shaft 7a and constitutes a prism whose vertical angle is variable.

Assuming that by the rotational motion of the camera body, the object is relatively rotated about the photo-taking lens L by an angle θ and shifts to the position of an object O', the image of the object O moves to a position F' on the film surface and this movement is image vibration.

FIG. 3B shows a state in which the image vibration is suppressed by the variable vertical angle prism.

In FIG. 3B, the transparent plate 2a of the variable vertical angle prism is inclined by an angle 100 and the vertical angle of the variable vertical angle prism is φ. When the refractive index of the transparent liquid 1 is n, and when φ=θ/n−1), the photo-taking optical path from the object O' is shaken by θ by the variable vertical angle prism and the object is imaged at the same position as the image position F when there is no camera vibration and thus, the suppression of image vibration is accomplished well.

However, the above-described vibration detecting means does not always detect the vibration of the camera accurately, for example, when the vibration detecting means is started or during panning.

For example, in the angular displacement meter of the FIG. 4 construction, before the starting of the image vibration suppressing means, the sensing vane 213 is indefinite in its position within the movable range, and after the starting of the image vibration suppressing means, the sensing vane moves to the central position with the electrical energization of the coil 219, and by the centering operation in which the sensing vane slowly vibrates about the central position several times and thereafter is stabilized substantially at the central position, the angular displacement meter assumes a state suitable for starting the detecting operation.

However, during this centering operation (usually several seconds), the output of the angular displacement meter is a signal including a low frequency component unrelated to the vibration to be suppressed.

Also, in the case of the angular velocity meter or the angular acceleration meter, there is not obtained an accurate output during the initial integration time for integrating angular velocity or angular acceleration and converting it into angular displacement.

On the other hand, during the so-called panning operation in which photographing is effected while the camera is operated, vibration of great amplitude and low frequency by the photographer's intention is added discretely from the vibration of the camera caused by ordinary hand trembling.

The then output from the vibration detecting means cannot be said to be an appropriate signal for the correction of vibration.

Further, a shake-back signal resulting from said vibration of great amplitude hinders the obtainment of a right vibration detection signal.

When a vibration signal at the initial stage of the starting of the angular displacement meter, the angular velocity meter or the angular displacement meter as described above or a vibration signal during panning (hereinafter simply referred to as the "unsuitable vibration detection signal") is adapted intact to drive the optic axis changing means, there has been the disadvantage that a right image vibration suppressing operation is not performed and therefore good photographing is not accomplished.

Also, in the case of panning, there has been the disadvantage that a signal stemming from the photographer's intention unrelated to the purpose of hand trembling suppression is mixed with a signal for correction.

SUMMARY OF THE INVENTION

The present invention has been made in view of the above-noted circumstances and an object thereof is to provide an image stabilizing device which is provided with vibration detection means for detecting a vibrated state, vibration preventing means responsive to the output of said vibration detection means to prevent the vibration of an image, and regulating means for regulating the action of said vibration detection means when the output of said vibration detection means is not appropriate and which eliminates the above-noted disadvantages peculiar to the prior art and in which as long as detection information from said vibration detection means is unsuitable after the starting of said vibration detection means, optic axis changing means is not caused to depend intact on the signal from said vibration detection means, thereby eliminating the unnecessary image vibration suppressing operation attributable to an unsuitable detection signal produced, for example, during the starting of an image vibration suppressing device, and during the panning operation, it can be prevented that a signal other than so-called hand trembling is mixedly present to make it impossible to obtain a good photographed image which reflects the photographer's intention.

Other objects of the present invention will become apparent from the following detailed description of some embodiments of the invention.

DESCRIPTION OF THE PREFERRED EMBODIMENTS

Figure 1:
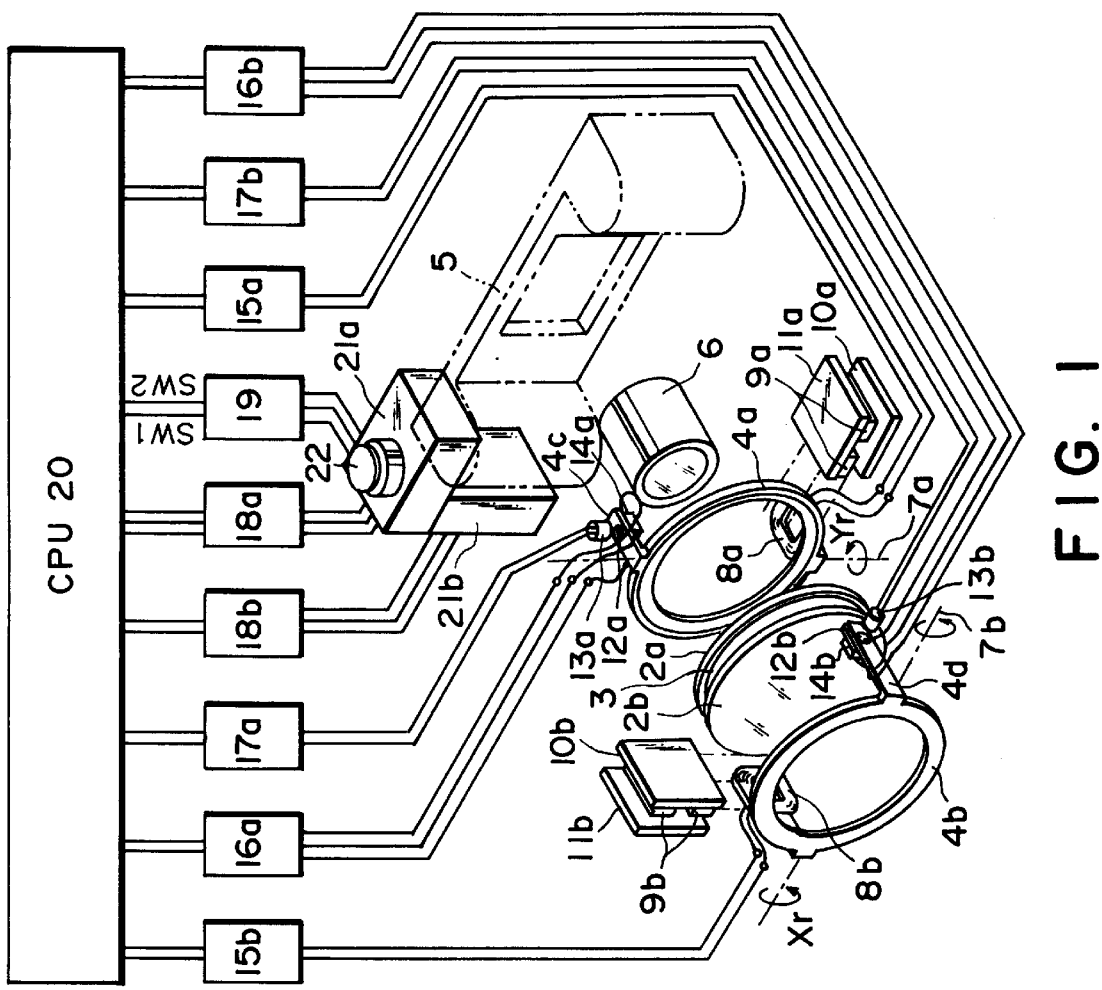
FIG. 1 is a perspective view illustrating the construction of the mechanism and circuit of an embodiment of a camera according to the present invention.
Figure 2:
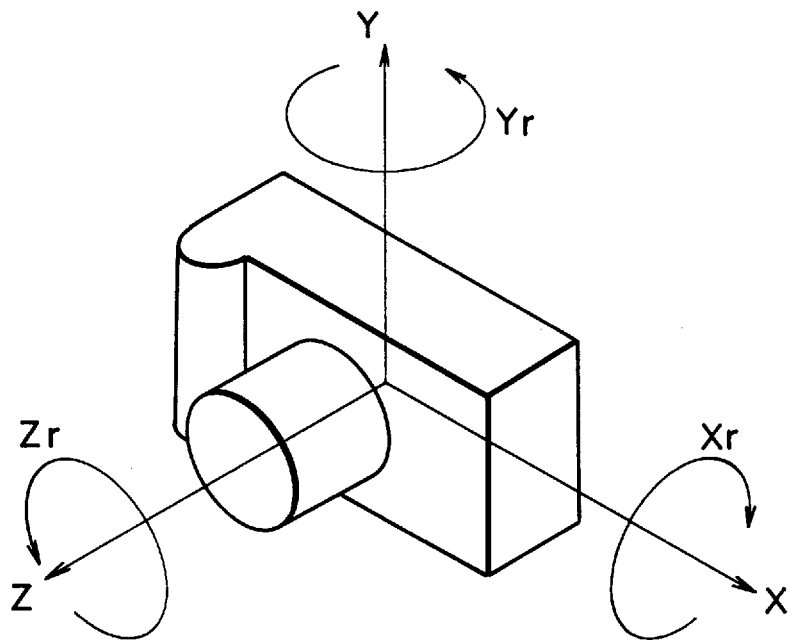
FIG. 2 is a schematic view illustrating the state of vibration of the camera.

Some embodiments of the present invention will hereinafter be described in detail with reference to the drawings. In FIGS. 1 to 8, elements common with those above discussed are given identical reference characters and need not be described in detail.

Figure 5:
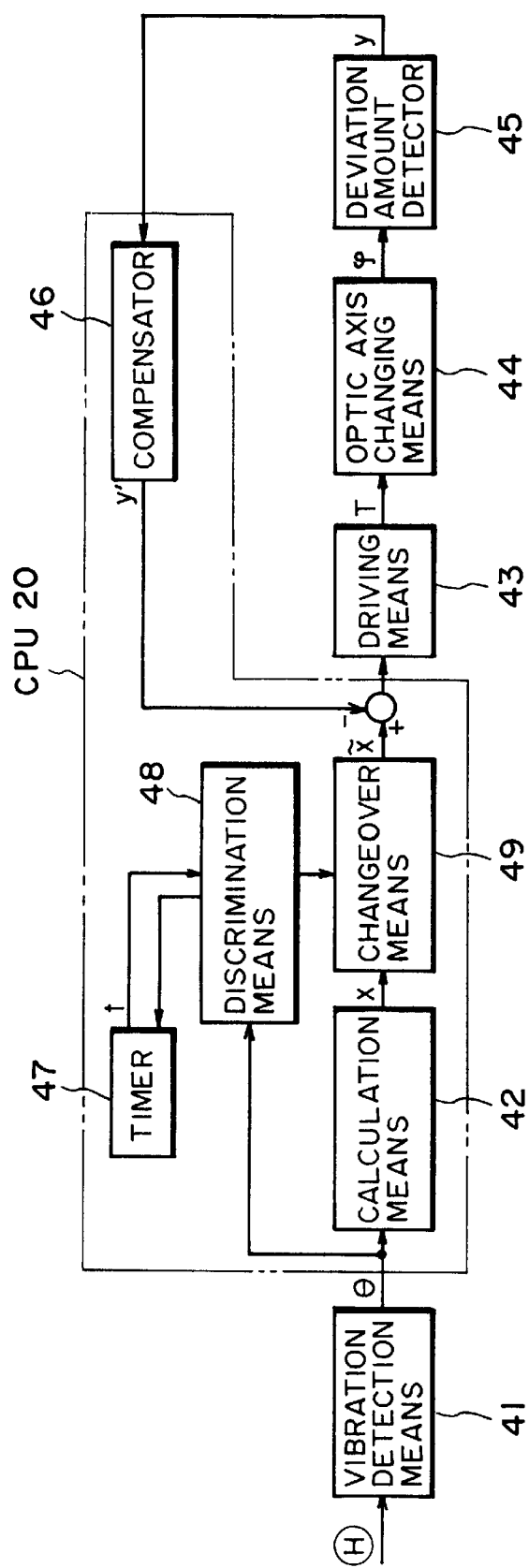
FIG. 5 is a block diagram showing a signal transmission system in the embodiment of FIG. 1.
Figure 6:
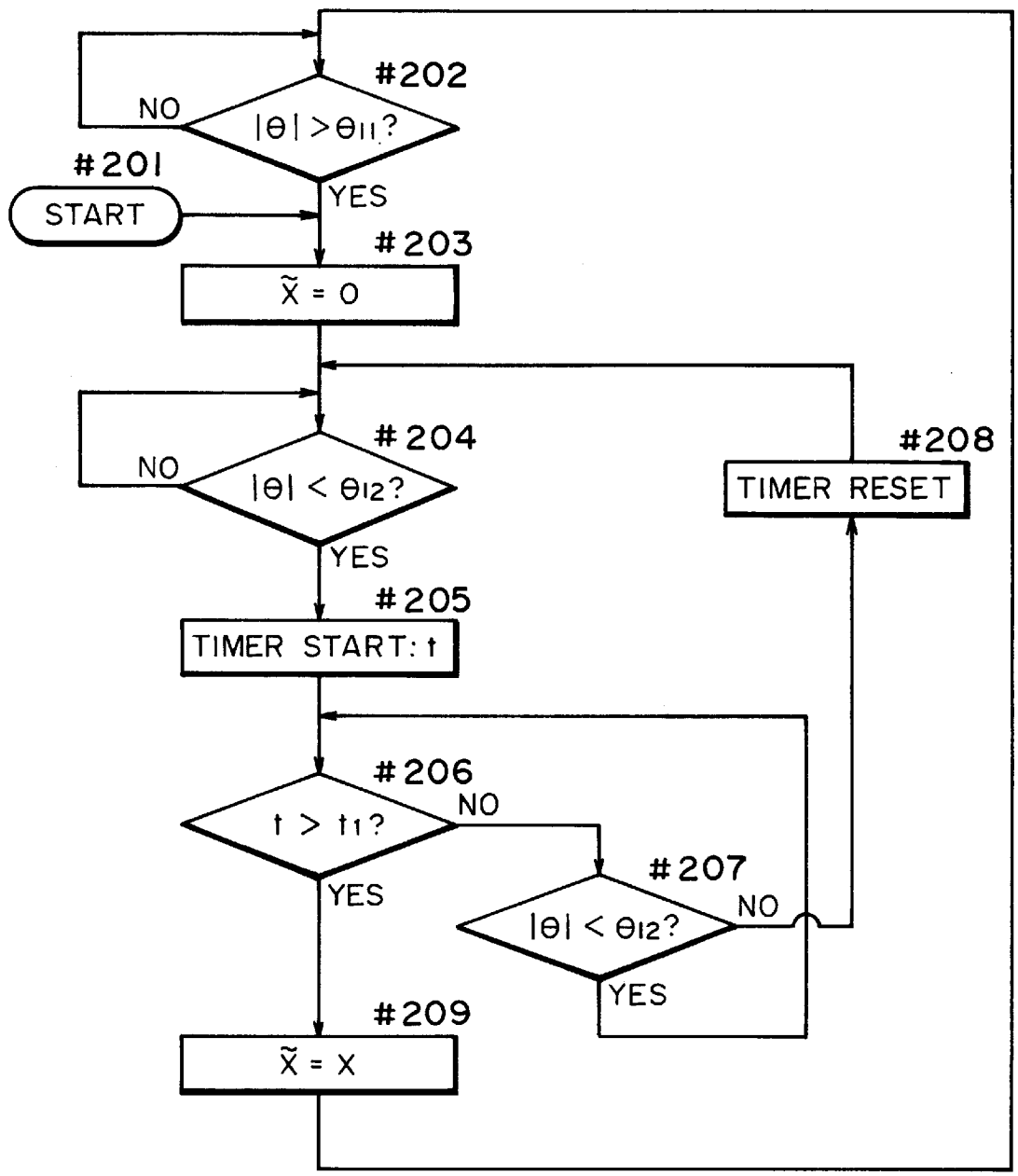
FIG. 6 is a flow chart showing the steps of the control procedure of the FIG. 1 embodiment.

FIG. 1 is a perspective view illustrating the construction of the mechanism and circuit of an embodiment of the camera of the present invention, FIG. 5 is a block diagram showing a signal transmission system in the present embodiment, and FIG. 6 is a flow chart showing the steps of the control procedure of the present embodiment.

The embodiment of the camera of the present invention shown in FIG. 1 has camera vibration detection means using an angular displacement meter, optic axis changing means using a variable vertical angle prism, calculation means for calculating the amount of change of the optic axis on the basis of the output of said vibration detection means, angular displacement detection means for detecting the angular displacement of the vertical angle of said variable vertical angle prism, driving means for driving said optic axis changing means, discrimination means for judging whether the output of said vibration detection means is an "unsuitable vibration detection signal", and changeover means for selecting one of a first operative state in which by the judgment by said discrimination means, said optic axis changing means is driven depending on the output of said vibration detection means to thereby effect the suppression of image vibration and a second operative state in which said optic axis changing means is held in a predetermined constant state without depending on the output of said vibration detection means and the suppression of image vibration is not effected.

This embodiment is one in which when the output of said vibration detection means is outside a first predetermined range, said optic axis changing means is immediately made stationary at a predetermined position, and then only after a state in which the output of said vibration detection means stays within a second predetermined range lasts for a first predetermined time, the amount of change of said optic axis changing means is caused to depend on the output of said vibration detection means.

Figure 4:
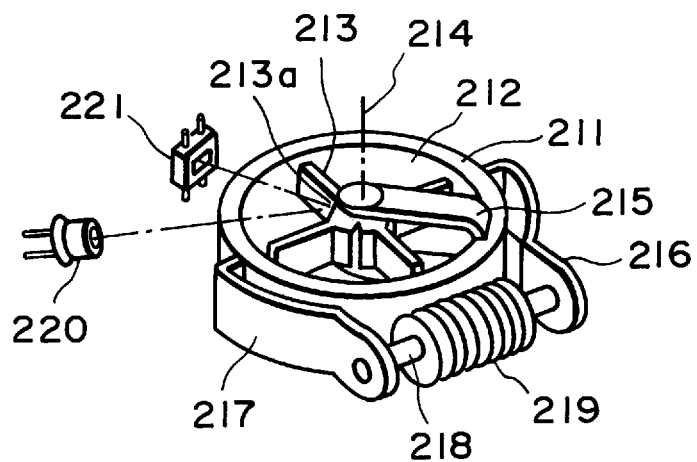
FIG. 4 is a perspective view showing the structure of vibration detection means using an angular displacement meter.
Figure 3A:
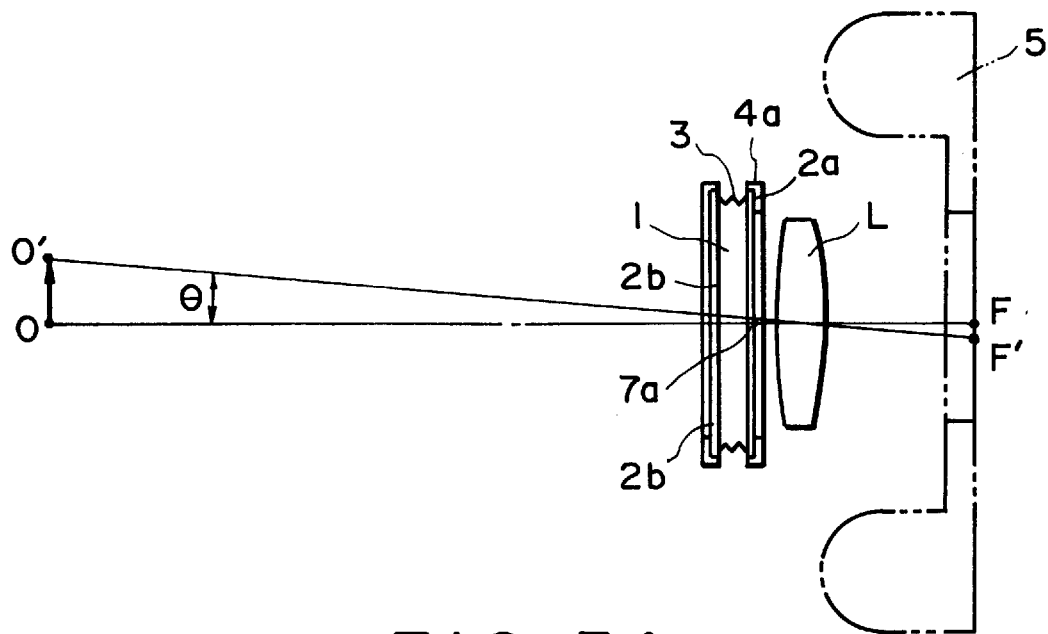
FIGS. 3A and 3B are illustrations of optic axis changing means using a variable vertical angle prism.
Figure 3B:
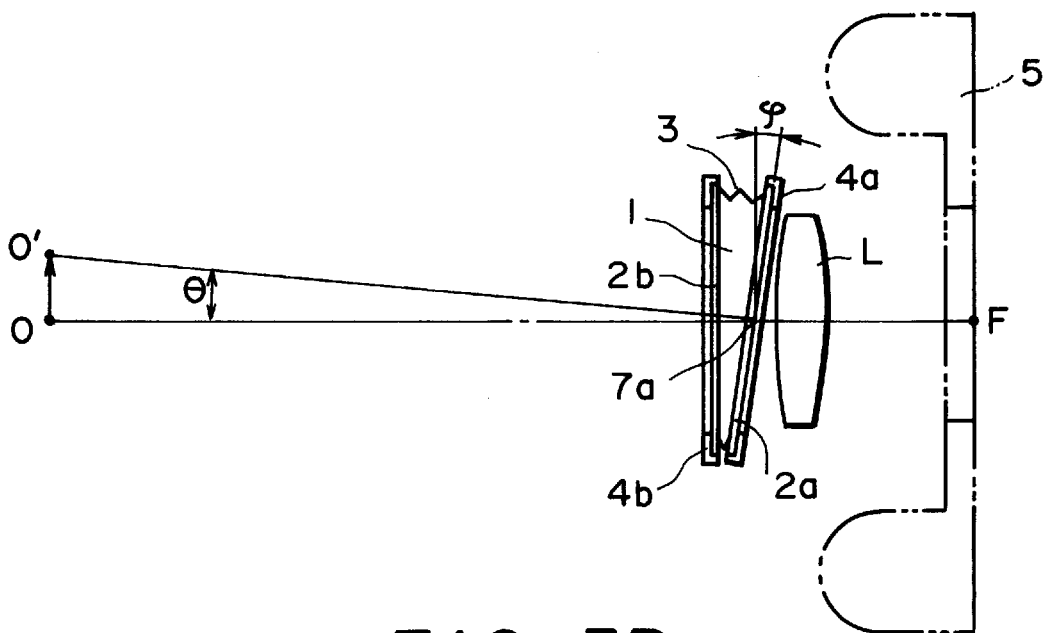

The vibration detection means of the camera of the present embodiment is similar to the vibration detection means using the angular displacement meter of FIG. 4, and the optic axis changing means of the present embodiment is similar to the optic axis changing means using the variable vertical angle prism of FIG. 3 and therefore, these means need not be described.

Also, the frame member 4a of the optic axis changing means of FIG. 1 is supported around a shaft 7a so as to be able to suppress vibration in a direction $Y_r$, while the frame member 4b of the optic axis changing means is supported around a shaft 7b so as to be able to suppress vibration in a direction $X_r$. The suppression of vibration in the direction $Y_r$ differs only in direction from the suppression of vibration in the direction $X_r$ and is similar to the latter in structure and action and therefore, chiefly the suppression of vibration in the direction $Y_r$ will hereinafter be described, and similar description of the suppression of vibration in the direction $X_r$ will be omitted. (Hereinafter, the constructions for the suppression of vibration in the direction $Y_r$ will be given a suffix "a" and the constructions for the suppression of vibration in the direction $X_r$ will be given a suffix "b".)

The driving means for driving said optic axis changing means (the variable vertical angle prism) has a coil 8a, a permanent magnet 9a, a yoke 10a and a yoke 11a.

The flattened type coil 8a is fixed to one end of the frame member 4a of the variable vertical angle prism, and the permanent magnet 9a, the yoke 10a and the yoke 11a are disposed so as to sandwich this coil therebetween in a non-contact manner. The permanent magnet 9a, the yoke 10a and the yoke 11a together form a closed magnetic circuit, and the coil 8a and the closed magnetic circuit together provide an actuator for generating a torque about the shaft 7a.

Also, the angular displacement detection means of the variable vertical angle prism has a slit 12a, a light emitting element 13a, a light receiving element 14a, etc.

That is, on the frame member 4a of the variable vertical angle prism, an arm 4c having a slit 12a is projected in the direction of the optic axis at a location symmetrical with the coil 8a, and the light emitting element 13a and the light receiving element 14a are disposed so as to sandwich the slit 12a therebetween.

The light emitting element 13a is, for example, an infrared light emitting diode IRED or the like, and the light receiving element 14a is an element whose output differs depending on the position of the light it receives, and for example, a photoelectric conversion element such as a semiconductive position detecting element PSD.

For the suppression of vibration in the direction $X_r$, a coil 8b, a permanent magnet 9b, a yoke 10b and a yoke 11b are likewise provided as driving means for driving the optic axis changing means (the variable vertical angle prism), and a slit 12b, a light emitting element 13b, a light receiving element 14b, etc., are likewise provided as the angular displacement detection means of the variable vertical angle prism.

As the calculation means in the present invention, use can be made, for example, of a calculation circuit contained in CPU 20.

In the present invention, the discrimination means for judging whether the input from the vibration detection means is an "unsuitable vibration detection signal" may be, for example, a conventional comparing circuit comprised of a comparator or the like, or a comparison calculation circuit in a conventional microcomputer. In the present embodiment, the above-described judgment is effected by the utilization of a comparison calculation circuit in the CPU 20 which will be described later.

The changeover of a driving signal in the present invention may be effected, for example, by the use of changeover means using two analog switches for changeover, or conventional two-direction changeover means such as changeover means for effecting slow changeover by the use of the pulse width modulation (PWM) technique.

Also, control means has the CPU 20, coil driving circuits 15a, 15b, position detection circuits 16a, 16b, light emitting element driving circuits 17a, 17b, vibration detection circuits 18a, 18b, a release switch circuit 19, etc., and the CPU 20 controls said various means through said various circuits.

For example, regarding the suppression of vibration in the direction $Y_r$, the CPU 20 electrically energizes the light emitting element 13a through the light emitting element driving circuit 17a so that the light emitting element 13a may keep an appropriate quantity of emitted light.

Also, the output of the light receiving element 14a is input to the CPU 20 through the position detection circuit 16a, and on the basis of this input, the CPU 20 appropriately electrically energizes the coil 8a through the coil driving circuit 15a.

The output signal of a vibration detector 21a is input to the CPU 20 through the vibration detection circuit 18a.

A release switch 22, like one used in a conventional camera, has two stages of stroke, and in a first stroke, it produces a signal SW1 for instructing the camera to perform various photographing preparation operations, and in a second stroke, it produces a signal SW2 for instructing the camera to perform the exposure operation. The signals thus produced are input to the CPU 20 through the release switch circuit 19.

What has been described above also holds true of the suppression of vibration in the direction $X_r$.

In FIG. 1, an A/D converter or a D/A converter which connects the CPU 20 to various analog circuits is not shown.

FIG. 5 is a block diagram showing a signal transmission system in the present embodiment.

In FIG. 5, the reference numeral 41 designates vibration detection means having the vibration detector 21a and vibration detection circuit 78a of FIG. 1.

The reference numeral 43 denotes driving means for the optic axis changing means having the actuator comprised of the coil 8a, the permanent magnet 9a and the yokes 10a and 11a of FIG. 1 and the coil driving circuit 15a.

The reference numeral 44 designates optic axis changing means having the transparent liquid 1, the transparent plates 4a, 2b, the resin film 3 and the frame members 4a, 4b of FIGS. 1 and 3.

The reference numeral 45 denotes the angular displacement detection means (deviation amount detection means) of the optic axis changing means having the light emitting element 13a, the light receiving element 14a and the position detection circuit 16a.

The vibration detection means 41 detects the amount of vibration ⓗ applied from the outside to the camera and outputs it as detected angular displacement θ. This angular displacement value is input to the CPU 20, is multiplied by an appropriate coefficient by the calculation means 42 and is converted into a command signal x. This command signal x is input to changeover means 49 having a function which will be described later, and is output as a command signal $\bar{x}$. The CPU 20 inputs this command signal $\bar{x}$ to the driving means 43 to cause it to produce a torque T and drive the optic axis changing means 44.

The output angular displacement φ of the optic axis changing means is transformed into a signal by the angular displacement detection means 45, and is transmitted as a signal y to the CPU 20.

The signal y is converted into a feedback signal y' by compensator means 46 using the computer program in the CPU 20 and is negatively fed back to the command signal $\bar{x}$, whereby a feedback control system is formed.

The compensator means 46 plays the role as a filter for the signal y, and stabilizes the entire system and realizes a high feedback gain, thereby eliminating the influence of disturbance and obtaining a faithful follow-up property and thus, making it possible to provide a high follow-up band.

The discrimination means 48 is of a construction using the comparison calculation circuit of the CPU 20 as described above, and starts the changeover means 49 and determines the value of the command signal $\bar{x}$ while referring to the detected angular displacement θ of the vibration detection means 41 and the output t of timer means 47.

FIG. 6 is a flow chart showing the procedure of determining $\bar{x}$. In FIG. 6, numbers indicate the steps of the processing procedure.

In FIG. 6, at the starting of the image vibration suppressing device (step #201), the driving signal $\bar{x}$ is first set to 0 by the changeover means 49 and the optic axis changing means is "held in a predetermined constant state".

The "predetermined constant state" of the present invention is, in the present embodiment, the central position of the movable range of the optic axis changing means as described above (that is, $\bar{x}$=0).

This changeover means 49, as described above, uses, for example, the pulse width modulation (PWM) technique so that the optic axis changing means 44 may gradually go toward the central position and finally become stationary at the central position.

The discrimination means 48 monitors the detected angular displacement θ, and when at a step #204, the absolute value of θ has become an appropriate vibration detection signal smaller than a preset second value $θ_{12}$ ($θ_{12}$>0), that is, when the output signal θ has fallen within the range of ±$θ_{12}$ centered at the medium 0 as an appropriate vibration detection signal, advance is made to a step #205, where the timer 47 is started, and the output t thereof is input to the discrimination means 48.

As long as at a step #206 and a step #207, |θ|<$θ_{12}$ until the output t exceeds a preset time $t_1$, return is made to the step #206, where time counting is continued, and only when the output t exceeds the time $t_1$, at a step #209, are the circuits connected by the changeover means 49 so that the driving signal $\bar{x}$ may become equal to the output x of the calculation means 42.

When the output t is within the time $t_1$ and moreover |θ|≧$θ_{12}$, shift is made from the step #207 to a step #208, where the timer 47 is reset to its initial state, and thereafter monitoring is continued until said θ falls within a predetermined range.

Now, at the step #209 $\bar{x}$=x, and after the image vibration suppressing device enters its operative state, advance is made to a step #202.

By the changeover of the changeover means 49, the driving signal of the optic axis changing means is changed over so as to be operatively associated with the output of the vibration detection means, and the optic axis changing means 44 starts the optic axis changing operation for the suppression of image vibration. When this operation is started, as well as when the optic axis changing means becomes stationary, control is effected, for example, by the use of said PWM and therefore, it does not happen that the viewfinder image becomes discontinuous to give the photographer a feeling of physical disorder.

The discrimination means 48 monitors the detected angular displacement θ from the vibration detection means 41, and when at the step #202, the absolute value of θ becomes greater than a preset first value $θ_{11}$ ($θ_{11}$>0), the discrimination means judges that of the "unsuitable vibration detection signal", panning has been detected, and advance is made to a step #203, where the driving signal $\bar{x}$ is made equal to 0 by the changeover means 49. As is seen from the foregoing, detection means 41 yields output for all fluctuations, i.e., arising from both panning and hand shaking. The described discrimination means determines from the output of the detection means whether the fluctuation is of one predetermined type, arising from hand shaking, or other predetermined type, arising from panning, and the system effects fluctuation suppression only on determination of fluctuations of the first predetermined type.

The steps #204–#209 are as described above.

As shown in the flow chart, during the panning operation, when the detected angular displacement θ is outside the range of ±$θ_{11}$, the image vibration suppressing operation is slowly stopped to thereby prevent the image vibration suppressing device from operating during panning.

Also, if the value of $θ_{12}$ is chosen appropriately, the optic axis changing operation can be started after an unnecessary signal by the shake-back during the termination of panning is sufficiently attenuated and therefore, as a whole, good photographing which reflects the photographer's intention becomes possible.

In the present embodiment, the detected angular displacement θ is monitored, but since the output x of the calculation means 42 is proportional to θ, a similar effected will be obtained even if the value of x instead of θ is monitored.

Also, in the present embodiment, design is made such that $\bar{x}$=0, that is, the optic axis changing means is made stationary at its central position, but in practical use, a method of cutting off the supply of electric power for driving may be adopted for the purpose of saving electric power.

Further, instead of making the optic axis changing means stationary at its central position, use may be made of a method of bringing about $\bar{x}=x'$ (that is, making the optic axis changing means stationary at a position whereat θ has become inappropriate) by the use of the value x' of x which corresponds to the value of θ before θ is judged to be inappropriate.

Embodiment 2

This embodiment is one is which means differing from that in Embodiment 1 is used as the discrimination means for the "unsuitable vibration detection signal", and which is designed such that only when the state in which the output of the vibration detection means is outside a predetermined range $\theta_{21}$ lasts for a predetermined time $t_{21}$ or longer, the output of the vibration detection means is judged to be the "unsuitable vibration detection signal" and the image vibration suppressing operation is stopped.

In this embodiment, provision is made of means for starting the image vibration suppressing operation when thereafter the sensing vane of the angular displacement meter autonomously effects centering and a state in which the output of the vibration detection means becomes small and stays within an angle $\theta_{22}$ (which corresponds to $\theta_{12}$ in Embodiment 1) lasts for a predetermined time $t_{22}$.

The constructions of the mechanisms and circuits of the present embodiment are similar to those of Embodiment 1 and therefore need not be described.

Figure 7:
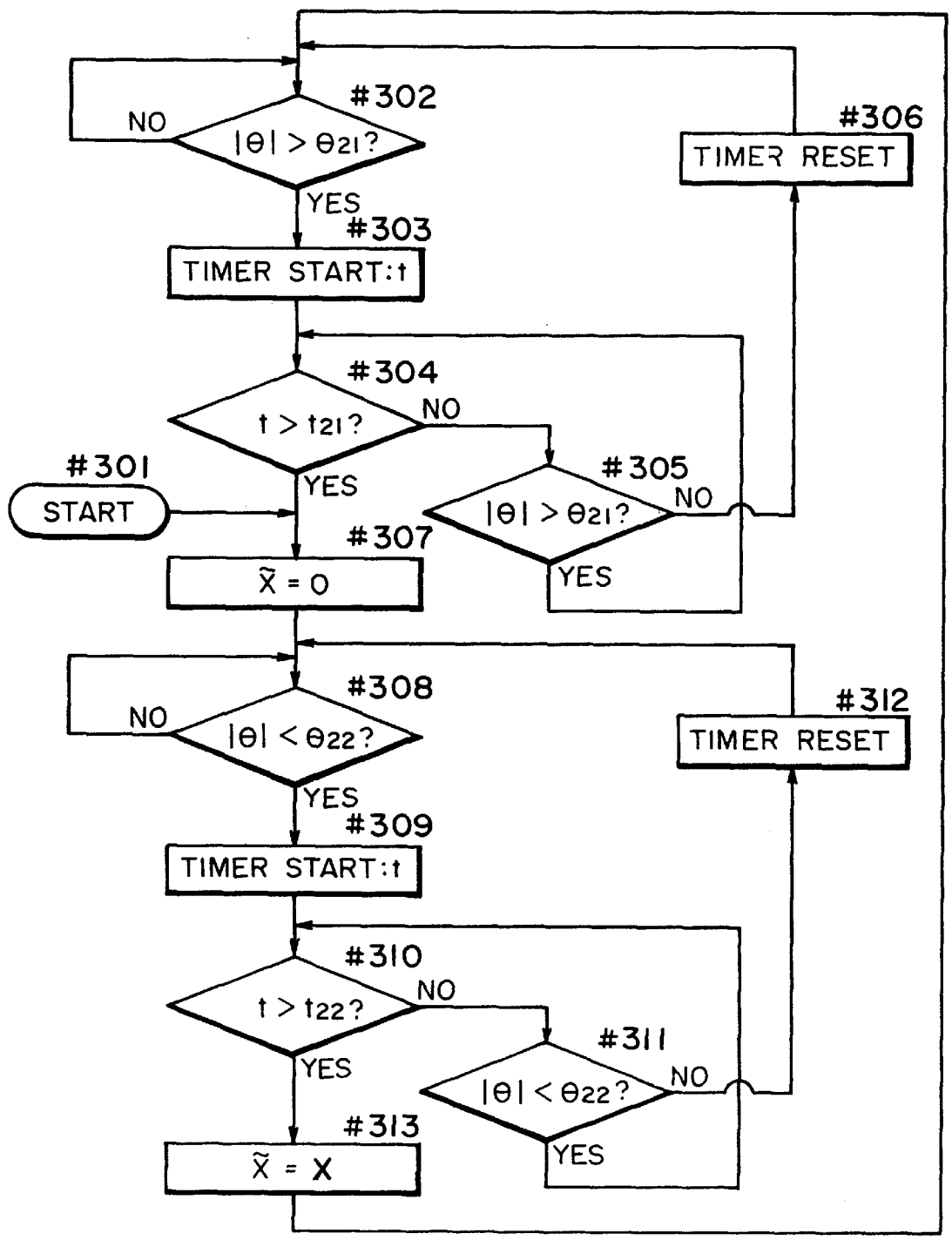
FIG. 7 is a flow chart showing the steps of the control procedure of a second embodiment of the camera of the present invention.

FIG. 7 is a flow chart showing discrimination means for the "unsuitable vibration detection signal" in the present embodiment, and the discrimination means 48 is similar to that of Embodiment 1 in that it starts the changeover means 49 while referring to the detected angular displacement θ detected by the vibration detection means 41 and the output t of the timer means 47.

Also, in FIG. 7, a step #301 shows the starting of the image vibration suppressing device, and steps #308–#313 are steps similar to the steps #204–#209 of the flow chart of FIG. 6 for Embodiment 1, that is, steps at which the image vibration suppressing operation is started or resumed only when the state in which the absolute value of the detected angular displacement θ is smaller than a predetermined fourth value $\theta_{22}$ lasts for a predetermined time $t_{22}$ or longer, and these steps are functionally similar to the case of Embodiment 1 and therefore need not be described.

In FIG. 7, at a step #302, the starting operation is already terminated and the device is at work, and the output driving signal $\bar{x}$ of the changeover means 49 is equal to the output x of the calculation means 42.

At the step #302, the discrimination means 48 is monitoring the detected angular displacement θ, and if at the step #302, the absolute value of θ is greater than a preset third value $\theta_{21}$ ($\theta_{21}>0$), time counting is started by the timer means 47 at a step #303.

As long as $|\theta| \geq \theta_{21}$ until at steps #304 and #305, said output t exceeds a preset second time $t_{21}$, return is made to the step #304, where time counting is continued, and only when this state exceeds the time $t_{21}$, at a step #307, is the driving signal $\bar{x}$ made equal to 0 by the changeover means 49.

By this changeover, the optic axis changing means 44 becomes stationary at its central position.

When θ has become $|\theta| \leq \theta_{21}$ within the time $t_{21}$, that is, when the state $|\theta|>\theta_{21}$ has not lasted longer than the time $t_{21}$, this signal is not judged to be the "unsuitable vibration detection signal", but at a step #306, the timer means 47 is reset, whereafter return is made to the step #302, where the image vibration suppressing operation is continued intact.

Embodiment 3

Figure 8:
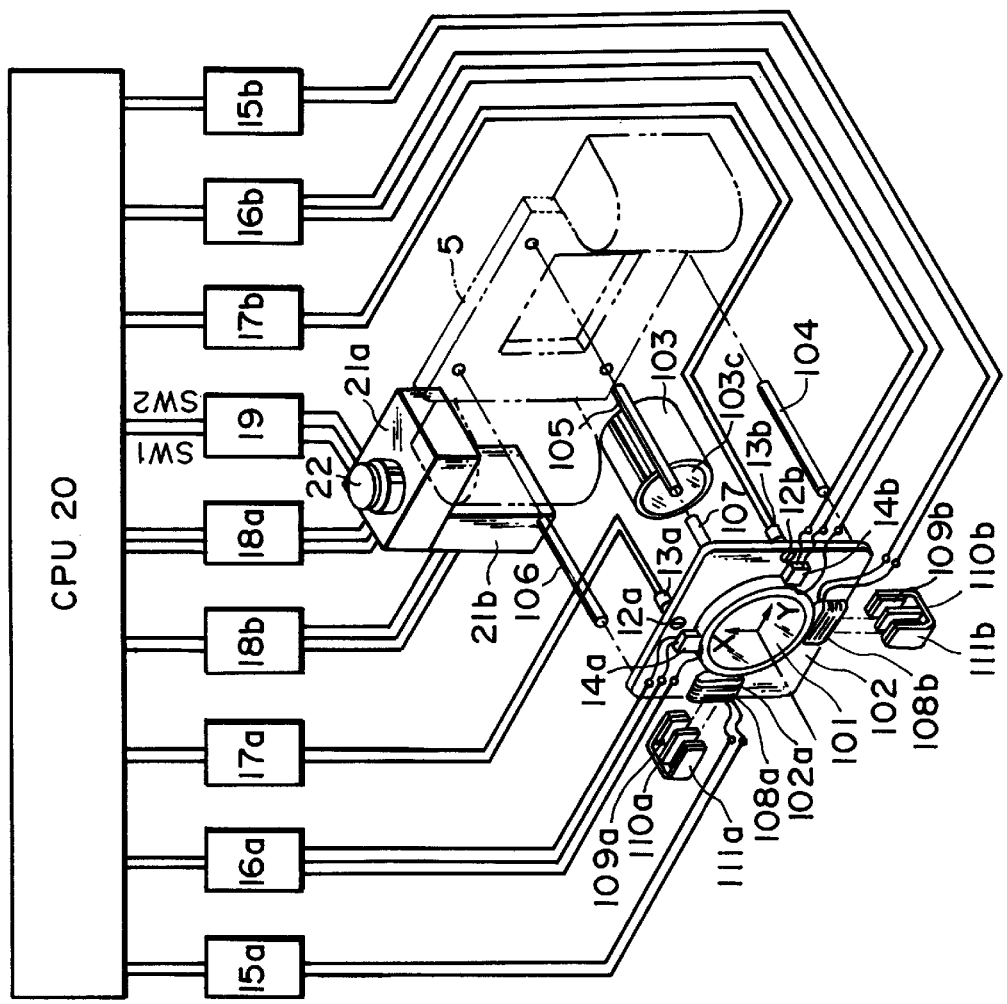
FIG. 8 is a perspective view illustrating the constructions of the mechanisms and circuits of a third embodiment of the camera of the present invention.

FIG. 8 is a perspective view illustrating the construction of the mechanisms and circuits in a third embodiment of the image vibration suppressing device of the present invention.

In Embodiment 1, the optic axis is changed by using a variable vertical angle prism as the optic axis changing means, whereas in the present embodiment, a correction lens for changing the optic axis is used as the optic axis changing means and is moved in a plane perpendicular to the optic axis to thereby effect a change of the optic axis.

In FIG. 8, the correction lens 101 is held by a frame member 102 which is supported in front of a lens barrel 103 by flexible support bars 104, 105, 106 and 107.

Regarding the suppression of vibration in the direction Y, a coil 108a is wound around a cut-away 102a formed in the frame member 102, a yoke 110a is disposed within the coil 108a and a permanent magnet 109a and a yoke 111a are disposed outside the coil 108a. The permanent magnet 109a, the yoke 110a and the yoke 111a together form a closed magnetic circuit, and the permanent magnet 109a, the yoke 110a, the yoke 111a and the coil 108a as a whole provide an actuator which produces a thrust in the direction Y.

A slit 12a is formed in the frame member 102, and a light emitting element 13a and a light receiving element 14a which are similar to those in Embodiment 1 are disposed on the opposite sides of the slit 12a, and form detection means for detecting the amount of displacement of the correction lens 101 in the direction Y.

The output of the light receiving element 14a is input to CPU 20 through a position detection circuit 16a, and on the basis of this input, the CPU 20 effects appropriate electrical energization of the coil 108a through a coil driving circuit 15a.

The constructions and actions of a vibration detector 21a, a vibration detection circuit 18a, a release switch 22, a release switch circuit 19, etc. are similar to those in Embodiment 1.

What has been described just above also holds true of the suppression of vibration in the direction X. (The constructions similar to those for the suppression of vibration in the direction Y are given identical reference numerals and a suffix "b".

Also, in FIG. 8, an in FIG. 1, as A/D converter or a D/A converter connecting the CPU 20 and various analog circuits together is not shown.

Also, a block diagram showing a signal transmission system in the present embodiment and a flow chart showing the operation steps of the present embodiment are similar to those for Embodiment 1.

Again by the construction of the present embodiment, an operation substantially similar to that of Embodiment 1 is obtained as the suppression of image vibration.

As described above, according to these embodiments, as long as the detection information from the vibration detection means is unsuitable after the starting of the vibration detection means, the optic axis changing means is not caused to depend on the signal from the vibration detection means and therefore, for example, the unnecessary image vibration suppressing operation attributable to the unsuitable detection signal produced during the starting of the image vibration suppressing device is eliminated and also, during the panning operation, it is prevented that a good photographed image reflecting the photographer's intention is not obtained due to the mixing of a signal other than so-called hand trembling.

In the above-described embodiments, an angular displacement meter is shown as the vibration detection means, but of course, the present invention can be equally applied even if this is replaced by other vibration detection means such as an acceleration meter, an angular acceleration meter, a velocity meter, an angular velocity meter or a sensor for directly detecting the vibrated state of an image.

Also, in the above-described embodiments, when the output of the vibration detection means is inappropriate, that output is not at all connected to the optic axis changing means, but of course, the present invention can be applied even if under a predetermined regulated state, the output of the vibration detection means is connected to the optic axis changing means.

Also, of course, the present invention can be equally applied even if use is made of other image stabilizing means than the optic axis changing means shown in the above-described embodiments, such as optic axis changing means using another method, or means for correcting an image signal to thereby prevent the vibration of an image.

Further, in the above-described embodiments, a camera has been taken as a example, but of course, the present invention can also be applied to other optical instruments.

I claim:

1. An apparatus adapted to an image blur prevention apparatus having a movable member movable for image blur prevention, comprising:
   a control portion for, corresponding to an output of a blur detection device for detecting a blur state, controlling an absolute position of said movable member in accordance with a blur signal corresponding to a detected blur displacement, said control portion controlling the absolute position of said movable member so that the blur signal and the absolute position satisfy a predetermined relationship; and
   a regulating portion for regulating the movement of the movable member in accordance with said blur signal when said blur signal becomes larger than a predetermined level.

2. An apparatus according to claim 1, wherein said regulating portion comprises means for causing the movable member not to perform the operation corresponding to the output from the blur detection device.

3. An apparatus according to claim 1, wherein said regulating device comprises means for performing the regulation in accordance with that the level of the blur signal is larger than the predetermined level.

4. An apparatus according to claim 3, further comprising release means for releasing the regulation by said regulating portion in accordance with that the level is smaller than the predetermined level.

5. An apparatus according to claim 4, wherein said release means comprises means for releasing the regulation by said regulating portion in accordance with that a state where the level of the blur signal is smaller than the predetermined level, has been kept for a predetermined time period.

6. An apparatus according to claim 1, wherein said blur detection device comprises means for detecting a fluctuation of an apparatus to which image blur is prevented.

7. An apparatus according to claim 1, wherein the image blur correction apparatus comprises image blur correction optical means for optically correcting image blur.

8. An apparatus according to claim 1, wherein the apparatus comprises the blur detection device.

9. An image blur prevention apparatus comprising:
   a movable member movable for image blur prevention;
   a control portion for, corresponding to an output of a blur detection device for detecting a blur state, controlling an absolute position of said movable member in accordance with a blur signal corresponding to a detected blur displacement, said control portion controlling the absolute position of said movable member so that the blur signal and the absolute position satisfy a predetermined relationship; and
   a regulating portion for regulating the movement of the movable member in accordance with said blur signal when said blur signal becomes larger than a predetermined level.

10. An optical equipment to which an image blur prevention apparatus having a movable member movable for image blur prevention is applied, comprising:
    a control portion for, corresponding to an output of a blur detection device for detecting a blur state, controlling an absolute position of said movable member in accordance with a blur signal corresponding to a detected blur displacement, said control portion controlling the absolute position of said movable member so that the blur signal and the absolute position satisfy a predetermined relationship; and
    a regulating portion for regulating the movement of the movable member in accordance with said blur signal when said blur signal becomes larger than a predetermined level.

11. A camera to which an image blur prevention apparatus having a movable member movable for image blur prevention is applied comprising:
    a control portion for, corresponding to an output of a blur detection device for detecting a blur state, controlling an absolute position of said movable member in accordance with a blur signal corresponding to a detected blur displacement, said control portion controlling the absolute position of said movable member so that the blur signal and the absolute position satisfy a predetermined relationship; and
    a regulating portion for regulating the movement of the movable member in accordance with said blur signal when said blur signal becomes larger than a predetermined level.

* * * * *

UNITED STATES PATENT AND TRADEMARK OFFICE
CERTIFICATE OF CORRECTION

PATENT NO. : 5,809,346
DATED : September 15, 1998
INVENTOR(S) : Tatsuo Fujisaki

It is certified that error appears in the above-identified patent and that said Letters Patent is hereby corrected as shown below:

Col. 3, line 7, Delete "100" and insert --¢--.
Col. 10, line 44, After "X", Delete "("
Col. 10, line 48, Delete " as " and insert --as--.

Signed and Sealed this

Twenty-fifth Day of May, 1999

Attest:

Q. TODD DICKINSON

Attesting Officer     Acting Commissioner of Patents and Trademarks